United States Patent
Isobe

(10) Patent No.: US 9,765,218 B2
(45) Date of Patent: Sep. 19, 2017

(54) POLYMER COMPOSITION

(71) Applicant: Henkel AG & Co. KGAA, Duesseldorf (DE)

(72) Inventor: Yukio Isobe, Kagawa (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/546,438

(22) Filed: Nov. 18, 2014

(65) Prior Publication Data

US 2015/0073093 A1 Mar. 12, 2015

Related U.S. Application Data

(63) Continuation of application No. PCT/JP2013/064969, filed on May 23, 2013.

(30) Foreign Application Priority Data

May 25, 2012 (JP) .................. 2012-120291

(51) Int. Cl.
| C08L 77/06 | (2006.01) |
| C08L 77/08 | (2006.01) |
| C09J 151/06 | (2006.01) |
| C09J 177/08 | (2006.01) |
| C08L 51/00 | (2006.01) |
| C08F 255/02 | (2006.01) |

(52) U.S. Cl.
CPC ............. *C08L 77/06* (2013.01); *C08L 51/003* (2013.01); *C08L 77/08* (2013.01); *C09J 151/06* (2013.01); *C09J 177/08* (2013.01); *C08F 255/02* (2013.01); *C08L 2203/206* (2013.01)

(58) Field of Classification Search
None
See application file for complete search history.

(56) References Cited

U.S. PATENT DOCUMENTS

| 5,506,298 | A | * | 4/1996 | Paul et al. ........................ 525/66 |
| 6,432,548 | B1 | * | 8/2002 | Alex ...................... B32B 27/08 |
|  |  |  |  | 428/475.8 |
| 7,795,336 | B2 |  | 9/2010 | Paul et al. |
| 2004/0024127 | A1 | * | 2/2004 | Baumert et al. ............... 525/178 |
| 2011/0091707 | A1 |  | 4/2011 | Jousset et al. |
| 2013/0247983 | A1 |  | 9/2013 | Jousset et al. |

FOREIGN PATENT DOCUMENTS

| CN | 1291622 A | 4/2001 |
| CN | 1441023 A | 9/2003 |
| CN | 1637052 A | 7/2005 |
| CN | 1726267 A | 1/2006 |
| EP | 1538149 A2 | 6/2005 |
| JP | 083444 A | 1/1996 |
| JP | 09111215 A | 4/1997 |
| JP | 2001270987 A | 10/2001 |
| JP | 2003268342 A | 9/2003 |
| JP | 2011519176 A | 6/2011 |
| WO | 2012052677 A1 | 4/2012 |

OTHER PUBLICATIONS

International Search Report for International Application No. PCT/JP2013/064969 dated Aug. 20, 2013.

* cited by examiner

*Primary Examiner* — Ana Woodward
(74) *Attorney, Agent, or Firm* — James E. Piotrowski

(57) ABSTRACT

The present invention provides a polymer composition having a low water absorption (i.e. being dampproof), excellent electrical insulation, high adhesion to various substrates, and excellent thermal stability. The present invention relates to a polymer composition comprising (A) a dimer acid-based polyamide and (B) an olefin-based-modified polymer, wherein the olefin-based-modified polymer (B) comprises a chemical structure derived from an olefin and a chemical structure derived from an amide.

12 Claims, No Drawings

POLYMER COMPOSITION

TECHNICAL FIELD

The present invention relates to a polymer composition and more specifically to a polymer composition as a hot melt composition for use in an electronic component.

BACKGROUND ART

A composition including an olefin-based, an olefin-acrylate-based, a polyamide-based, or a polyester-based polymer is used as a hot melt composition to protect (waterproofing, dampproofing, dustproofing, electrical insulation, and fixation) an electronic component.

A hot melt composition capable of maintaining electrical insulation is used to protect an electronic component. Various improvements to a hot melt composition have been made. Specifically, examples of the improvements include a method for reducing water absorption of a hot melt composition, and a method for enhancing adhesion between an adherend (plastic material such as polyolefin and metal such as aluminum and copper) constituting an electronic component and a hot melt composition so as to prevent the entry of water or moisture.

Among various hot melt compositions, a polyamide-based hot melt composition may be used for an electronic component, with high regard for adhesion to an adherent. As a type of polyamide-based hot melt composition, a dimer acid-based polyamide is used in an electronic component. A "dimer acid-based polyamide" as referred to herein is a polyamide produced from the reaction of an acid component including a dimer acid and a diamine component as described below.

A dimer acid-based polyamide exhibits good adhesion to a plastic having relatively high polarity (e.g. polyvinyl chloride and polyethylene terephthalate), and a metal such as aluminum and copper. A dimer acid-based polyamide has, however, insufficient adhesion force to a substrate having an olefin structure with low polarity such as polyethylene and polypropylene. Furthermore, a dimer acid-based polyamide exhibits relatively high water absorption, which causes a problem in maintaining the performance of an electronic component.

Meanwhile, it is known that other polymer materials are added to a dimer acid-based polyamide for use in an electronic component so as to improve the electric properties of the electronic component.

Patent Literature 1 discloses that a carboxyl group-containing olefin and a dimer acid-based polyamide are mixed to produce a mixture composition for use in a temperature sensor and a thermosensitive heating wire.

According to the same literature, the composition (temperature sensitive polymer body) has excellent water absorption properties and mechanical properties (adhesion properties).

Patent Literature 2 discloses a hot melt adhesive composition of a mixture of a polyolefin, a polyolefin which contains an acid anhydride or a carboxyl group, and a dimer acid-based polyamide. The literature has disclosed that the hot melt adhesive composition has improved adhesion to various adherends such as polyethylene, polyvinyl chloride and metal, and improved damp-proof properties.

The compositions described in Patent Literatures 1 and 2 have, however, problems for use as a hot melt composition including poor flow stability, large viscosity change, and inferior thermal stability in a molten state. While various performance of a hot melt composition for an electronic component is required to be stable for a long time under high temperature, the compositions according to both of the literatures do not sufficiently satisfy the recent user's severe requirements.

Therefore, a polymer composition having low water absorption, excellent electrical insulation, good adhesion to plastic and metal, and small viscosity change is much needed in order to maintain the performance of an electronic component.

CITATION LIST

Patent Literature

Patent Literature 1: Japanese Laid-open Patent Publication No. H04(1992)-3085
Patent Literature 2: Japanese Patent No. 4385409

SUMMARY OF INVENTION

Technical Problem

An object of the present invention is to solve the above problem and to provide a polymer composition having low water absorption (i.e. being dampproof), excellent electrical insulation, high adhesion to various substrates, and excellent thermal stability.

Solution to Problem

As the result of earnest research effort, the present inventors found that the problem is surprisingly solved by adding a modified polymer having a specific structure to a dimer acid-based polyamide, to accomplish the present invention. The present invention and preferred embodiments of the present invention are as follows:

1. A polymer composition comprising: (A) a dimer acid-based polyamide and (B) an olefin-based-modified polymer, wherein the olefin-based-modified polymer (B) comprises a chemical structure derived from an olefin and a chemical structure derived from an amide.

2. A polymer composition according to the item 1, wherein the olefin-based-modified polymer (B) comprises a chemical structure derived from an olefin and a polyamide graft group.

3. A polymer composition according to the item 1 or 2, wherein the olefin-based-modified polymer (B) is a grafted polymer produced by polymerizing an olefin, a (meth) acrylic acid ester and an acid anhydride, and grafting a polyamide on a copolymer thereby obtained.

4. A polymer composition according to the item 2 or 3, wherein the polyamide graft group is at least one selected from polyamide 6, polyamide 11, and polyamide 12.

5. A polymer composition according to the item 3 or 4, wherein the acid anhydride comprises maleic anhydride.

6. A polymer composition according to the item 5, wherein the olefin-based-modified polymer (B) is a grafted polymer produced by a reaction of a polyamide with a maleic anhydride unit.

7. A polymer composition according to any one of the items 1 to 6, wherein the dimer acid-based polyamide (A) is a polymer produced by a reaction of an acid component comprising the dimer acid with a diamine component.

8. A hot melt composition comprising the polymer composition according to any one of the items 1 to 7.

9. An electronic component obtained by coating with the hot melt composition according to item 8.

Advantageous Effects of Invention

A polymer composition of the present invention has excellent stability of viscosity in a molten state under high temperature (i.e. thermal stability), improved adhesion to a polyolefin having low polarity, good adhesion to a metal, reduced water absorption, and excellent electrical insulation.

Since a hot melt composition of the present invention comprises the polymer composition, it can achieve reduced water absorption, improved electrical insulation, and excellent stability of viscosity in a molten state under high temperature (thermal stability). Consequently, the flowability thereof hardly changes during use in a long period. The hot melt composition has excellent electric properties and good adhesion to a polyolefin having low polarity and a metal, which is suitably used for various electronic components.

Since an electronic component of the present invention is obtained by coating with the hot melt composition, it has excellent electric properties such as electrical insulation, detachment of an adherend of polyolefin or metal is not leaded, and it is capable of being used under high temperature for a long period without deterioration.

DESCRIPTION OF EMBODIMENTS

A polymer composition of the present invention comprises: (A) a dimer acid-based polyamide and (B) an olefin-based-modified polymer having a chemical structure derived from an olefin and a chemical structure derived from an amide. Each component is described below.

<(A) A Dimer Acid-Based Polyamide>

A "dimer acid-based polyamide (A)" as referred to herein is a polymer produced by a reaction of an acid component comprising a dimer acid and a diamine component. Preferably the reaction is a polycondensation reaction. The polymer composition of the present invention achieves better adhesion to metal by comprising the dimer acid-based polyamide (A).

The dimer acid-based polyamide (A) of the present invention is not specifically limited as long as the effect of the present invention is achieved, and may include a polymer produced by using an acid component other than the dimer acid in combination, such as a monocarboxylic acid, a dicarboxylic acid, and a multivalent carboxylic acid, in addition to the dimer acid. The dimer acid-based polyamide (A) may be a black or gray colored polymer.

The dimer acid is produced by bimolecular polymerization of an unsaturated fatty acid such as oleic acid and linoleic acid, a drying oil fatty acid or a semi-drying oil fatty acid, and a lower monoalcohol ester of these fatty acids in the presence or absence of a catalyst. In general, the dimer acid is obtained as a mixture of an unreacted monomer, a dimer as a main component, and other high-order polymers. As needed, the dimer acid for use may be highly concentrated by proper fractionation means such as vacuum distillation or a solvent extraction process. In addition, in order to reduce the degree of unsaturation, polymerized fatty acids may be hydrogenated before or after the fractionation so as to produce a saturated dimer acid for use.

A commercially available dimer acid may be used, including, for example, Pripol 1017, Pripol 1022, Pripol 1029, Pripol 1012, Pripol 1013, Pripol 1014, Pripol 1025, Pripol 1027, Pripol 1006, and Pripol 1010 made by Croda Japan KK, and Tsunodime 216 and Tsunodime 395 made by Tsuno Co., Ltd. One kind of dimer acid may be singly used or two or more kinds of dimer acids may used in combination. Preferably one kind or two or more kinds of these in combination are selected from Pripol 1012, Pripol 1013, Pripol 1014, Pripol 1006, Pripol 1010, and Tsunodime 395.

In the present invention, the content of the dimer acid is preferably 30 mol % or higher, more preferably 50 mol % or higher, and may be 100 mol %, in 100 mol % acid component to produce the dimer acid-based polyamide (A).

Among the acid components other than the dimer acid, examples of the monocarboxylic acid include acetic acid, propionic acid, benzoic acid, lauric acid, oleic acid, stearic acid, talloil fatty acid, cyclohexane carboxylic acid, and 1-adamantane carboxylic acid. One kind of these may be singly used or two or more kinds of these may be used in combination. More preferably, at least one is selected from lauric acid, oleic acid, stearic acid, and talloil fatty acid among these.

Among the acid components other than the dimer acid, examples of the dicarboxylic acid include oxalic acid, malonic acid, succinic acid, glutaric acid, adipic acid, pimelic acid, suberic acid, azelaic acid, sebacic acid, nonamethylenedicarboxylic acid, decamethylenedicarboxylic acid, undecamethylenedicarboxylic acid, dodecamethylenedicarboxylic acid, tridecamethylenedicarboxylic acid, tetradecamethylenedicarboxylic acid, pentadecamethylenedicarboxylic acid, hexadecamethylenedicarboxylic acid, maleic acid, fumaric acid, phthalic acid, terephthalic acid, 1,3-, or 1,4-cyclohexanedicarboxylic acid, and 1,3-adamantanedicarboxylic acid. One kind of these may be singly used or two or more kinds of these may be used in combination. More preferably, at least one is selected from adipic acid, pimelic acid, suberic acid, azelaic acid, and sebacic acid among these.

Among the acid components other than the dimer acid, examples of the multivalent carboxylic acid include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,2,4-cyclohexanetricarboxylic acid, tetra(methylenecarboxyl)methane, 1,2,7,8-octanetetracarboxylic acid, and pyromellitic acid. One kind of these may be singly used or two or more kinds of these may be used in combination.

Examples of the diamine component to produce the dimer acid-based polyamide (A) include ethylenediamine, triethylenediamine, tetraethylenediamine, hexamethylenediamine, p- or m-xylenediamine, 4,4'-methylene bis(cyclohexylamine), 2,2-bis(4-cyclohexylamine), polyetherdiamine, isophoronediamine, 1,2-, 1,3-, or 1,4-cyclohexanediamine, 1,4-bis(2'-aminoethyl)benzene, piperazine, 1,3-di-4-piperidylpropane, and a dimer diamine having an amino group converted from a carboxyl group of the dimer acid above. One kind of the diamines may be singly used or two or more kinds of the diamines may be used in combination. More preferably at least one selected from ethylenediamine, hexamethylenediamine, polyetherdiamine, piperazine, 1,3-di-4-piperidylpropane, and the dimer diamine among these is used.

The dimer acid-based polyamide (A) has a softening point of preferably 80 to 220° C., particularly preferably 150 to 200° C. The softening point as referred to herein is a value measured by an automatic softening point meter (ring and ball type) in accordance with JIS K 2207 for testing petroleum asphalts. When the softening point is in the range, the flowability of the polymer composition of the present invention is stabilized.

In the present invention, the dimer acid-based polyamide (A) has an amine number of preferably 10 or less, particularly preferably 3 or less. When the amine number is in the range, the flowability of the polymer composition of the present invention is stabilized. The amine number as referred to herein is the number of milligrams of potassium hydroxide equivalent to the equivalent of hydrochloric acid to neutralize amino groups included in 1 g of the dimer acid-based polyamide (A). More specifically, the amine number is measured as follows:

Amine number=$(x \times f \times y \times 56.108)/z$ wherein
(x) represents the amount (mL) of hydrochloric acid required for neutralization,
(f) represents the titer of hydrochloric acid,
(y) represents the concentration (mol/L) of hydrochloric acid, and
(z) represents the weight (g) of the dimer acid-based polyamide (A).

In the present invention, the dimer acid-based polyamide (A) has a viscosity of preferably 100 to 10000 mPa·s at 210° C., particularly more preferably 1000 to 8000 mPa·s. When the viscosity of the dimer acid-based polyamide (A) is in the range, a metal and an olefin is to be easily coated with the polymer composition of the present invention.

In the present invention, a commercially available dimer acid-based polyamide (A) may be used, including, for example, Macromelt OM633, Macromelt OM641, Macromelt OM646, Macromelt OM651, Macromelt OM652, Macromelt OM657, Macromelt OM641, Macromelt OM673, Macromelt OM682, Macromelt 6208, Macromelt 6790, Macromelt 6801, Macromelt 6830, Macromelt 6832, and Macromelt 6839 made by Henkel Japan Ltd. Among these, Macromelt OM652 is suitable as the dimer acid-based polyamide (A) of the present invention.

In the polymer composition of the present invention, a blending amount of the dimer acid-based polyamide (A) is preferably 20 to 95 weight parts, more preferably 50 to 90 weight parts, relative to 100 weight parts of the total weight of the dimer acid-based polyamide (A) and the olefin-based-modified polymer (B).

<(B) Olefin-based-modified Polymer>

In the present invention, an olefin-based-modified polymer (B) has a chemical structure derived from an olefin and a chemical structure derived from an amide.

The term "a chemical structure derived from an olefin" means a chemical structure comprising repeating units based on an olefin (i.e. polyolefin), which may be copolymerized with a monomer other than the olefin, or may be substituted with a different functional group at any position. The term "a chemical structure derived from an amide" means a chemical structure comprising repeating units based on an amide (i.e. polyamide), which may be substituted with a different functional group at any position. A "chemical structure derived from an olefin" as referred to herein may be described as a "polyolefin."

In the present invention, preferably the olefin-based-modified polymer (B) is a grafted polymer having a chemical structure derived from an olefin and a polyamide graft group. In the polymer composition of the present invention, when the olefin-based-modified polymer (B) is a grafted polymer having a chemical structure derived from an olefin and a polyamide graft group, compatibility of the dimer acid-based polyamide (A) with the olefin-based-modified polymer (B) becomes better, no phase separation in a molten state under high temperature causes, the viscosity in a more stable state can be maintained, and adhesion to a polyolefin having low polarity can be more improved. In the case that the olefin-based-modified polymer (B) is the grafted polymer, the chemical structure derived from an olefin constitutes a main chain.

Preferably the polyolefin of the present invention is a polymer including an α-olefin.

Preferably the α-olefin has 2 to 30 carbon atoms. Examples of the α-olefin include ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene, and 1-triacontene. In the present invention the "α-olefin" includes styrene. Preferably the α-olefin is propylene or ethylene, particularly preferably ethylene.

In the present invention, the polyolefin may be a homopolymer of a single α-olefin polymerized in a polymer chain. Examples of the polyolefin of a homopolymer include polyethylene (PE) and polypropylene (PP).

In the present invention, the polyolefin may be a copolymer of at least two comonomers copolymerized in a polymer chain. In this case, one ("a first comonomer") of the two comonomers is an α-olefin, and another one ("a second comonomer") is a monomer which can be copolymerized with the first monomer. In the present invention, two or more monomers may be copolymerized as the second comonomer, which does not depart from the scope of the present invention.

Examples of the second comonomer include the following:
(1) One of the α-olefins, which is different from the first α-olefin comonomer;
(2) Dienes, examples of which include 1,4-hexadiene, ethylidene, norbornene and butadiene;
(3) (meth)acrylic acid esters, examples of which include an alkyl acrylate or alkyl methacrylate that are classified into an alkyl(meth)acrylate. The alkyl(meth)acrylate may have an alkyl chain with 30 carbon atoms or less. Examples of the alkyl chain include methyl, ethyl, propyl, n-butyl, sec-butyl, isobutyl, tert-butyl, pentyl, hexyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, hencosyl, docosyl, tricosyl, tetracosyl, pentacosyl, hexacosyl, heptacosyl, octacosyl, and nonacosyl. The (meth)acrylic acid ester is preferably a methyl (meth)acrylate, an ethyl(meth)acrylate, and a butyl(meth)acrylate; and
(4) Carboxylic acid vinyl esters, examples of which include vinyl acetate, vinyl versatate, vinyl propionate, vinyl butyrate, and vinyl maleate. The carboxylic acid vinyl ester is preferably vinyl acetate.

In the present invention, preferably the polyolefin is an ethylene/alkyl(meth)acrylate copolymer.

Preferably the polyolefin comprises the first comonomer in an amount of at least 50 mol %, and more preferably having a density of 0.91 to 0.96.

Preferably the polyolefin of the present invention includes at least one type of residues of unsaturated monomer (X). More preferably the residue can react with an acid and/or an amine functional group as a reactive terminal group of a polyamide graft group by a condensation reaction, and the polyamide graft group is combined with the polyolefin through the residue of the unsaturated monomer (X). Preferably the residue of the unsaturated monomer (X) is combined with a polyolefin main chain by grafting or copolymerization. In the present invention, the unsaturated monomer (X) is not included in "the second comonomer."

Examples of the unsaturated monomer (X) comprised in the polyolefin include the following:

(1) Unsaturated epoxides, examples of which include an aliphatic glycidyl ester and an ether such as allyl glycidyl ether, vinyl glycidyl ether, glycidyl maleate and itaconate, glycidyl acrylate, and glycidyl methacrylate, wherein the unsaturated epoxide may also include an alicyclic glycidyl ester and an ether such as 2-cyclohexene-1-glycidyl ether, cyclohexene 4,5-diglycidylcarboxylate, cyclohexene-4-glycidylcarboxylate, 5-norbornene-2-methyl-2-glycidylcarboxylate, and endocis-bicyclo[2,2,1]-5-heptene-2,3-diglycidylcarboxylate, and wherein glycidyl methacrylate is preferred among them;

(2) Unsaturated carboxylic acids and the salts thereof, examples of which include acrylic acid or methacrylic acid and the salt thereof; and (3) Acid anhydrides, examples of which include anhydrides of maleic acid, itaconic acid, citraconic acid, allyl succinic acid, cyclohexy-4-ene-1,2-dicarboxylic acid, 4-methylenecyclohexy-4-ene-1,2-dicarboxylic acid, bicyclo[2,2,1]hepto-5-ene-2,3-dicarboxylic acid, and x-methylbicyclo[2,2,1]hepto-5-ene-2,2-dicarboxylic acid anhydride, wherein maleic acid anhydride is preferred. When the polyolefin of the olefin-based-modified polymer (B) comprises maleic anhydride as an acid anhydride, a maleic anhydride unit reacts with polyamide and the grafting of polyamide progresses more efficiently. Consequently, the reaction of the dimer acid-based polyamide (A) with the olefin-based-modified polymer (B) is hardly caused, so that the viscosity of the polymer composition can be more stably maintained in a molten state under high temperature.

Preferably the unsaturated monomer (X) is selected from acid anhydrides and unsaturated epoxides. A preferred embodiment of the present invention includes the olefin-based-modified polymer (B) having a polyamide graft group grafted on a polyolefin which is obtained by the reaction of an amine functional group as a reactive terminal group of a polyamide graft group with an acid anhydride, preferably maleic anhydride, as the unsaturated monomer (X). Another embodiment includes the olefin-based-modified polymer (B) having a polyamide graft group grafted on a polyolefin which obtained by the reaction of a carboxylic acid functional group as a reactive terminal group of a polyamide graft group with an unsaturated epoxide as the unsaturated monomer (X).

In the present invention, the number of the unsaturated monomer (X) comprised in the polyolefin is not specifically limited. For example, in the case that the unsaturated monomer (X) is maleic anhydride and the polyolefin has a number average molecular weight of 15,000 g/mol, the ratio of maleic anhydride is preferably 0.8 mol % to 6.5 mol % relative to the total number of monomers included in the polyolefin.

Examples of the chemical structure having an amide structure to constitute the olefin-based-modified polymer (B), i.e. a polyamide, include polycaprolactam (polyamide 6), polyundecanamide (polyamide 11, commercially available from Arkema K.K. under the trade name RILSAN (registered trademark)), polylauryllactam (polyamide 12, commercially available from Arkema K.K. under the trade name RILSAN (registered trademark)), polybutylene adipamide (polyamide 4, 6), polyhexamethylene adipamide (polyamide 6, 6), polyhexamethylene azelamide (polyamide 6, 9), polyhexamethylene sebacamide (polyamide 6, 10), polyhexamethylene dodecanamide (polyamide 6, 12), polydecamethylene dodecanamide (polyamide 10, 12), polydecamethylene sebacamide (polyamide 10, 10), and polydodecamethylene dodecanamide (polyamide 12, 12). The polyamide may be singly used, or a plurality of kinds may be used in combination. Among these, one or a combination of two or more kinds selected from polyamide 6, polyamide 11, and polyamide 12 is preferred. A more preferred example of the combination of two or more kinds is the combination of polyamide 6 and polyamide 12. When the polymer composition of the present invention comprises the olefin-based-modified polymer (B) comprising a grafted polymer having at least one kind of polyamide graft group selected from polyamide 6, polyamide 11, and polyamide 12, compatibility of the dimer acid-based polyamide (A) with the olefin-based-modified polymer (B) is further improved, and phase separation in a molten state under high temperature can be avoided.

The polyamide to form a graft chain may be any one of a homopolyamide and a copolyamide.

Preferably the polyamide graft group has a terminal group having an amine functional group. Preferably the polyamide graft group has a molecular weight of 1000 to 5000 g/mol, more preferably 2000 to 3000 g/mol.

In a preferred embodiment of the present invention, the olefin-based-modified polymer (B) includes a grafted polymer produced by grafting a polyamide on a copolymer, in which the copolymer is produced by polymerizing an olefin, a (meth)acrylic acid ester, and an acid anhydride, including a compound of a copolymer of an olefin and a (meth)acrylic acid ester, which is attached with an acid anhydride. By the use of the copolymer, the grafting of the polyamide proceeds efficiently. Consequently, the reaction of the dimer acid-based polyamide (A) with the olefin-based-modified polymer (B) is hardly caused in the polymer composition of the present invention, so that the viscosity of the polymer composition can be more stably maintained in a molten state under high temperature. In the present invention, it is particularly preferred that the acid anhydride include maleic anhydride.

In the present invention, preferably the olefin-based-modified polymer (B) comprises 50 to 95 weight % of polyolefin and 5 to 50 weight % of polyamide graft group.

In the present invention, the olefin-based-modified polymer (B) has a melting point of preferably 100 to 200° C., particularly preferably 100 to 170° C. A melting point as referred to herein is a value measured by using differential scanning calorimetry (DSC). More specifically, 10 mg of a sample is weighed in an aluminum container and the weighed sample is measured at a temperature increase rate of 10° C./min by using DSC6220 (trade name) made by SII NanoTechnology Inc., then the temperature at the apex of a melting peak is referred to as the melting point.

The olefin-based-modified polymer (B) in the present invention has a melt flow index of preferably 1 to 100, more preferably 5 to 90, and particularly preferably 10 to 80. When the melt flow index is in the range, the polymer composition is easily coated on an electronic component. In other words, when the olefin-based-modified polymer (B) has a melt flow index of 1 to 100, the polymer composition of the present invention is easily applied to an adherend as a constituent of an electronic component, or suitable for sealing an electronic component.

"Melt flow index", which is also referred to as solution index, is a most common criteria for indicating the flowability of a polymer in a molten state. "Melt flow index" is determined as follows: an amount of a polymer that flows out from a nozzle (orifice) having a prescribed size at a certain pressure and at certain temperature is measured by an extrusion plastometer, and a numerical value in unit of g/10 min is referred to as "Melt flow index". In general, the larger the melt flow index is, the better the flowability and the workability are in a molten state. The melt flow index as referred to herein is the number of grams of the polymer which flows out in 10 minutes at 190° C. under a load of 2.16 kg in accordance with ISO 1133.

The olefin-based-modified polymer (B) of the present invention may be a commercially available product including, for example, Apolhya Solar LC1, Apolhya Solar LC2, Apolhya Solar LC3, Apolhya Solar LC4, Apolhya Solar LC8, Apolhya Solar LP1, Apolhya Solar LP2, Apolhya Solar LP3, Apolhya Solar LP4, Apolhya Solar LP21, Apolhya Solar LP21P1, Apolhya Solar LP81, Apolhya Solar LP91, Apolhya Solar LB1, and Apolhya Solar LB91 available from Arkema K.K.

In the present invention, a blending amount of the olefin-based-modified polymer (B) is preferably 5 to 80 weight parts, particularly preferably 10 to 50 weight parts relative to 100 weight parts of the total weight of the dimer acid-based polyamide (A) and the olefin-based-modified polymer (B). When the blending amount of the olefin-based-modified polymer (B) is in the range, the polymer composition of the present invention can have further reduced water absorption, more excellent electrical insulation, more improved adhesion to a non-polar substrate or a metal, and more excellent thermal stability.

The polymer composition of the present invention may further contain various kinds of additives as needed. Examples of the various kinds of additives include a tackifier resin, a stabilizer (an antioxidant and a UV absorber), a wax, a fine particle filler, and a plasticizer.

Examples of the tackifier resin include a natural rosin, a modified rosin, a hydrogenated rosin, a glycerol ester of natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a three-dimensional polymer of a natural terpene, a hydrogenated derivative of a hydrogenated terpene copolymer, a polyterpene resin, a hydrogenated derivative of a phenol based modified terpene resin, an aliphatic petroleum hydrocarbon resin, a hydrogenated derivative of an aliphatic petroleum hydrocarbon resin, an aromatic petroleum hydrocarbon resin, a hydrogenated derivative of an aromatic petroleum hydrocarbon resin, a cyclic aliphatic petroleum hydrocarbon resin, and a hydrogenated derivative of a cyclic aliphatic petroleum hydrocarbon resin. The tackifier resins may be used singly or in combination. Among the tackifier resins, a cyclic aliphatic petroleum hydrocarbon resin and a hydrogenated derivative of an aromatic petroleum hydrocarbon resin are particularly preferred.

Examples of the commercially available products of the tackifier resins include YS Polyster T115 (trade name) made by Yasuhara Chemical Co., Ltd., ECR5400, ECR179EX (trade name), and ECR231C (trade name) made by Exxon Mobile Corporation, Marukaclear H (trade name) made by Maruzen Petrochemical Co., Ltd., Clearon K100 (trade name) made by Yasuhara Chemical Co., Ltd., Arkon M100 (trade name) made by Arakawa Chemical Industries Ltd., I-Marv Y135 (trade name) made by Idemitsu Petrochemical Co., Ltd., Clearon K4090 (trade name) and Clearon K4100 (trade name) made by Yasuhara Chemical Co., Ltd., and Eastotac H-100W (trade name) and Regalite R7100 (trade name) made by Eastman Chemical Company. The commercially available products of the tackifier resins may be used singly or in combination.

The "stabilizer" is blended to prevent reduction of molecular weight by heating, gelation, coloration, generation of an odor and the like in the polymer composition to improve the stability of the polymer composition. The "stabilizer" is not particularly limited as long as the polymer composition targeted by the present invention can be obtained. Examples of the "stabilizer" include an antioxidant and an ultraviolet absorbing agent.

The "ultraviolet absorbing agent" is used to improve the light resistance of the polymer composition. The "antioxidant" is used to prevent the oxidative degradation of the polymer composition. The antioxidant and the ultraviolet absorbing agent are not particularly limited, and may be used as long as they are generally used, and the polymer composition having the effect of the present invention can be obtained.

Examples of the antioxidant include phenol-based antioxidants, sulfur-based antioxidants and phosphorus-based antioxidants. Examples of the ultraviolet absorbing agent include benzotriazole-based ultraviolet absorbing agents and benzophenone-based ultraviolet absorbing agents. Further, a lactone-based stabilizer may also be added. These may be used alone or in combination. As commercial products of antioxidants, the following products may be used. Specific examples thereof include SUMILIZER GM (trade name), SUMILIZER TPD (trade name) and SUMILIZER TPS (trade name) manufactured by Sumitomo Chemical Co., Ltd., IRGANOX 1010 (trade name), IRGANOXHP2225FF (trade name), IRGAFOS 168 (trade name), IRGANOX 1520 (trade name) and TINUVIN P manufactured by Ciba Specialty Chemicals, JF77 (trade name) manufactured by Johoku Chemical Co., Ltd., and Adeka Stab AO-60 (trade name) manufactured by ADEKA CORPORATION. These stabilizers may be used alone or in combination.

The polymer composition of the present invention may further include a fine particle filler, a plasticizer, and the like. A fine particle filler commonly used may be used and is not particularly limited as long as the polymer composition having the effect of the present invention can be obtained.

Examples of the "fine particle filler" include mica, calcium carbonate, kaolin, talc, titanium oxide, diatomaceous earth, a urea based resin, styrene beads, fired clay and starch. Preferably these have a spherical shape, of which size (diameter of the sphere) is not particularly limited.

The "plasticizer" is blended for the purposes of reducing the melt viscosity of the polymer composition, providing flexibility to the polymer composition, and improving wetting property to an adherend. The plasticizer is not particularly limited as long as it is compatible with other components, and the polymer composition having the effect of the present invention can be obtained. Examples of the plasticizer include sulfonamides, paraffin-based oils, naphthene-based oils and aromatic oils. Sulfonamides are preferred, having an excellent plasticizing effect, particularly on a polyamide.

Examples of the plasticizer commercially available include Topcizer No. 1S, Topcizer No. 3, Topcizer No. 5, Topcizer No. 7, and Topcizer No. 8 manufactured by Fuji Amide Chemical Co., Ltd., White Oil Broom 350 (trade name) manufactured by Kukdong Oil & Chemicals Co., Ltd., Diana Fresia S32 (trade name), Diana Process Oil PW-90 (trade name), and Daphne Oil KP-68 (trade name) manufactured by Idemitsu Kosan Co., Ltd., Enerper M1930 (trade name) manufactured by BP Chemicals Ltd., Kaydol (trade name) manufactured by Crompton Corp., Primo 1352 (trade name) manufactured by Exxon Mobile Corporation, and Process Oil NS-100 (trade name) manufactured by Idemitsu Kosan Co., Ltd. These may be used singly or in combination.

The polymer composition of the present invention is produced by a common method without requiring a special manufacturing method. The sequence of addition of the individual components and the blending method are not particularly limited as long as the polymer composition having the effect of the present invention can be obtained.

Examples of the method for producing the polymer composition of the present invention include:
(1) A method comprising the steps of premixing the dimer acid-based polyamide (A), the olefin-based-modified polymer (B), and various kinds of additives as needed at a predetermined ratio, and blending the mixture in a batch-type reaction pot having a biaxial extruder or a heating agitator at a temperature between 180 and 215° C.; and
(2) A method comprising the steps of synthesizing the dimer acid-based polyamide (A) in a batch-type reaction pot having a heating agitator and a decompressor in advance, and then adding and blending the olefin-based-modified polymer (B) and various kinds of additives.

The polymer composition of the present invention can be formed by injecting the polymer composition melted at high temperature into a mold. An electronic component may be preliminarily set in the mold so as to be protected. More specifically, the polymer composition is melted by heating at a temperature between about 130 and 230° C. in a heating tank and be injected into a mold through an injection nozzle. After the elapse of a predetermined cooling time, a formed product is obtained by taking out the molded article from the mold.

An equipment for forming is not particularly limited, but may include a common hot melt applicator. Examples include Mold-man 8000 manufactured by Cavist Corporation, WS102/MX3006 manufactured by Nordson Corporation, ST-2 manufactured by Nordson Corporation, Dynamelt Series manufactured by ITW Dynatec K.K., and OPTIMEL 2002 manufactured by Optimel Schmelzgusstechnik GmbH.

The polymer composition of the present invention has a viscosity at 210° C. of preferably less than 2,000,000 mPa·s, more preferably less than 400,000 mPa·s. The viscosity herein means a value measured at a steady temperature of 210° C., at a rotation of 0.25 to 20 rpm, by a Brookfield viscometer (No. 27 or No. 29 spindle). The polymer composition of the present invention having a viscosity in the range is easily applied to an adherend, particularly suitable for molding (sealing) an electronic component.

In a preferred embodiment of the present invention, the polymer composition of the present invention is used as a hot melt composition. The hot melt composition as referred to herein means a composition which is in a solid form (solid object) at room temperature, which has flowability when heated for application to a target object such as a core material and an adherend, and which is solidified again when cooled. Since the hot melt composition of the present invention comprises the polymer composition, water absorption thereof is reduced, electrical insulation thereof is improved, and it has excellent viscosity stability (thermal stability) in a molten state under high temperature. Further, since the polymer composition of the present invention has flowability which hardly changes during use in a long time and excellent electric properties, it is suitable as a hot melt composition for an electronic component. Furthermore, since the hot melt composition of the present invention has excellent adhesion to a polyolefin having low polarity and a metal, it is applicable to various electronic components.

Preferably the polymer composition of the present invention as a hot melt composition is applied to an electronic component for a vehicle, a communication device, a computer, and household appliances.

The electronic component as referred to herein is a component for use in electrical equipment. Examples of the electronic component include a transistor, a diode, a motor, a capacitor, a coil, a transformer, a cell, a printed circuit board, a connector, a socket, a plug, a switch, a sensor, a fuse, an antenna, a harness, and a cable.

The electronic component of the present invention has excellent electric properties resulting from the coating with the polymer composition (hot melt composition) having excellent electrical insulation, water absorption, and thermal stability. In particular, a switch or a sensor which has the printed circuit board molded with the hot melt composition provides an electronic component having excellent waterproof property, dampproof property, dustproof property, electrical insulation, and adhesion.

EXAMPLES

The present invention is described in detail in view of the following Examples and Comparative examples. The Examples are given for illustrative purpose only, and the present invention is not limited thereto.

The individual components of the polymer compositions used in Examples and Comparative examples are as follows:
(A) Dimer acid-based polyamide
(A1) Macromelt OM652 manufactured by Henkel Japan Ltd. (Softening Point: 160° C. (measured in accordance with JISK 2207), Viscosity at 210° C.: 4000 mPa·s, Amine number: 0.2)
(A2) Macromelt OM673 manufactured by Henkel Japan Ltd. (Softening Point: 185° C. (measured in accordance with JISK 2207), Viscosity at 210° C.: 3000 mPa·s, Amine number: 0.5)
(B) Olefin-based-modified polymer having a chemical structure derived from an amide
(B1) Apolhya Solar LC1 manufactured by Arkema K.K. (Melting point: 145° C., Melt flow index: 20 g/10 minutes (190° C., 2.16 kg, measured in accordance with ISO 1133))
(B2) Apolhya Solar LC2 manufactured by Arkema K.K. (Melting point: 145° C., Melt flow index: 30 g/10 minutes (190° C., 2.16 kg, measured in accordance with ISO 1133))
(B3) Apolhya Solar LC3 manufactured by Arkema K.K. (Melting point: 130° C., Melt flow index: 18 g/10 minutes (190° C., 2.16 kg, measured in accordance with ISO 1133))
(B') Olefin-based-modified polymer having no structure derived from an amide
(B'4) Lotader 8200 manufactured by Arkema K.K. (Ethylene-ethyl acrylate-maleic anhydride copolymer containing 6.5 weight % of ethyl acrylate and 2.8 weight % of maleic anhydride, Melting point: 100° C., Melt flow index: 200 g/10 minutes (190° C., 2.16 kg, measured in accordance with ISO 1133))
(B'5) ENABLE EN33330 manufactured by Exxon Mobile Corporation (Ethylene-butyl acrylate copolymer containing 33 weight % of n-butyl acrylate, Melt flow index: 330 g/10 minutes (190° C., 2.16 kg, measured in accordance with ISO 1133))
(B'6) Hi-WAX 2203A manufactured by Mitsui Chemicals, Inc. (Maleic anhydride-modified polyethylene, Melting point: 107° C., Softening point: 111° C., (measured in accordance with JISK 2207), Viscosity at 140° C.: 300 mPa·s, Acid number: 30 KOH mg/g (measured in accordance with JIS K 5902))

These components were mixed in weight ratios shown in Table 1 and Table 2. The mixture were agitated and blended in a glass container heated at a temperature between 200 and 210° C. for one hour using a propeller type impeller so as to prepare the polymer composition. Further, the produced polymer composition was defoamed under vacuum reduced pressure in an oven heated at 205° C. With regard to Comparative examples 1 and 2, raw materials were defoamed under vacuum reduced pressure in an oven heated at 205° C., respectively.

For the polymer compositions of Examples and Comparative examples, coatability, water absorption, electrical insulation, adhesion, and thermal stability were evaluated. The coatability was evaluated based on a viscosity index. The water absorption was evaluated based on a water absorption index. The electrical insulation was evaluated based on a volume resistance index. The thermal stability was evaluated based on phase separation, the presence or absence of gelation, and the rate of change in viscosity. The adhesion was evaluated based on a tensile shear strength index. All of the indices are based on those of Comparative example 1. Each of the indices of Examples and Comparative examples is a numerical value relative to an index of 100 for Comparative example 1. In regard to electrical insulation, both of the polymer composition before absorbing water and the polymer composition after absorbing water were evaluated. The individual evaluation is as follows.

<Evaluation of Coatability (Viscosity Index)>

The polymer composition in an amount of 10.5 to 10.6 g was placed in a viscosity can of a Brookfield viscometer heated at 210° C. so as to be melted. The temperature was kept at 210° C. for 30 minutes and then the viscosity (mPa·s) was measured at a rotation of 0.25 to 20 rpm using a Brookfield viscometer with a No. 27 or No. 29 spindle.

The ratio of the viscosity of each Example and Comparative example to the viscosity of Comparative example 1 was represented as the viscosity index. The viscosity index was obtained from the following calculation formula:

(Viscosity index)=(Viscosity of each Example or Comparative example)×100/(Viscosity of Comparative example 1)

The coatability was evaluated based on the calculated viscosity index. The evaluation criteria are as follows:
  ∘∘: Viscosity index is less than 1000.
  ∘: Viscosity index is 1000 or more but less than 10000.
  Δ: Viscosity index is 10000 or more but less than 50000.
  ×: Viscosity index is 50000 or more.

<Evaluation of Water Absorption (Water Absorption Index)>

The polymer compositions of Examples and Comparative examples were immersed in water at 23° C. for 24 hours, the change of weight was measured. A precision balance having a minimum reading of 0.1 mg was used for the measurement of the weight. The water absorption rate was measured using the following calculation formula:

(Water absorption rate)=((Weight of polymer composition after water absorption (24 hours))−(Initial weight of polymer composition))×100/(Initial weight of polymer composition)

The ratio of the water absorption rate of each Example and Comparative example to the water absorption rate of Comparative example 1 was represented as the water absorption index.

The water absorption index was obtained from the following calculation formula:

(Water absorption index)=(Water absorption rate of each Example or Comparative example)×100/(Water absorption rate of Comparative example 1)

The water absorption was evaluated based on the calculated water absorption index. The evaluation criteria are as follows:
  ∘∘: Water absorption index is less than 80.
  ∘: Water absorption index is 80 or more but less than 90.
  Δ: Water absorption index is 90 or more but less than 100.
  ×: Water absorption index is 100 or more.

<Evaluation of Electrical Insulation (Volume Resistance Index)>

(1) Evaluation of Electrical Insulation Before Water Absorption

Using a compression molding machine AYSR-5 made by Shinto Metal Industries Corporation, the polymer composition (15.0 to 16.0 g) was melted at 190° C. and pressed under a pressure of 5 MPa, to prepare a sheet with a length of 80 mm, a width of 80 mm, and a thickness of 2 mm. The sheet was used as a sample for the measurement of volume resistivity.

Using a super megaohm meter SM-8215 and a plate sample electrode SME-8311 made by TOA Electronics Ltd., the volume resistivity (Ω·cm) was measured after application of 500 V for one minute.

The ratio of the volume resistivity of each Example and Comparative example to the volume resistivity of Comparative example 1 was represented as volume resistance index for indicating the evaluation of electrical insulation. The volume resistivity index was obtained from the following calculation formula:

(Volume resistance index)=(Volume resistivity of each Example or Comparative example)×100/(Volume resistivity of Comparative example 1)

(2) Evaluation of Electrical Insulation after Water Absorption

After the polymer composition was immersed in water at 23° C. for 24 hours, the volume resistivity was measured in the same way and the volume resistance index was calculated.

The evaluation criteria for the electrical insulation of the polymer composition before water absorption and the polymer composition after water absorption are as follows:
  ∘∘: Volume resistance index is 1000 or more.
  ∘: Volume resistance index is 500 or more but less than 1000.
  Δ: Volume resistance index is more than 100 but less than 500.
  ×: Volume resistance index is 100 or less.

<Evaluation of Thermal Stability (Rate of Change in Viscosity)>

The stability of the polymer composition in a molten state was evaluated. The polymer composition was heated at 210° C. for 7 hours under nitrogen atmosphere, and the presence or absence of phase separation and gelation were respectively determined. The presence of phase separation or the presence of gelation means that the polymer composition is not stable in a molten state, namely, poor thermal stability.

Further, after the polymer composition was heated at 210° C. for 5 hours in air, the viscosity was measured in the same way as above. The rate of change in viscosity before and after heating was obtained from the following calculation formula:

(Rate of change in viscosity)=((Viscosity of each Example or Comparative example after heat treatment)−(Viscosity of each Example or Comparative example before heat treatment))×100/(Viscosity of each Example or Comparative example before heat treatment)

The smaller an absolute value of the rate of change in viscosity is, the smaller the change in viscosity due to the heat treatment is, meaning excellent thermal stability.

The rate of change in viscosity was also evaluated based on the following unit of measurement for indicating thermal stability.

∘∘: Absolute value of the rate of change in viscosity is less than 10.

∘: Absolute value of the rate of change in viscosity is 10 or more and less than 20.

Δ: Absolute value of the rate of change in viscosity is 20 or more and less than 100.

×: Absolute value of the rate of change in viscosity is 100 or more.

<Evaluation of Adhesion (Tensile Shear Strength)>

The adhesion of the polymer composition was evaluated based on the tensile shear strength to adherends including polyethylene, polypropylene, aluminum, and copper. Each adherend had a rectangular shape with a width of 25 mm, a length of 100 mm, and a thickness of 2 mm. The polymer composition was melted at 230° C. in air, and two adherends were laminated such that the coating had a 25 mm square area with a thickness of 1 mm so as to prepare a test piece. Each adherend was preheated so that wettability of the polymer composition becomes better. In an hot air dryer oven, polyethylene and polypropylene were preheated at 80° C. for 30 minutes, and aluminum and copper were preheated at 150° C. for 30 minutes, which were taken out from the hot air dryer oven for use immediately before coating with the polymer composition.

The test piece was left to stand at 23° C. in a room for one day, and the tensile shear strength was then measured at a stroke speed of 50 mm/minutes using a load cell UR-500L (maximum load: 500 kg) made by Orientec Co., Ltd. and a testing machine RTM-250 made by Orientec Co., Ltd.

The tensile shear strength index was obtained from the following calculation formula:

(Tensile shear strength index)=(Tensile shear strength of each Example or Comparative example)×100/(Tensile shear strength of Comparative Example 1)

The larger the tensile shear strength index means the higher the adhesion force. Using the tensile shear strength index as an indicator of the adhesion force, the adherends of polyethylene and polypropylene were respectively evaluated based on the following criteria.

∘∘: Tensile shear strength index is 300 or more.

∘: Tensile shear strength index is 200 or more but less than 300.

Δ: Tensile shear strength index is more than 100 but less than 200.

×: Tensile shear strength index is 100 or less.

In the same way, the adherends of aluminum and copper were respectively evaluated based on the following criteria.

∘∘: Tensile shear strength index is 100 or more.

∘: Tensile shear strength index is 80 or more but less than 100.

Δ: Tensile shear strength index is 60 or more but less than 80.

×: Tensile shear strength index is less than 60.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| (A1) | 90 | 80 | 50 | 20 | 80 | 70 | 60 | 80 |
| (A2) | | | | | | | | |
| (B1) | 10 | 20 | 50 | 80 | | | | |
| (B2) | | | | | 20 | 30 | 40 | |
| (B3) | | | | | | | | 20 |
| (B'4) | | | | | | | | |
| (B'5) | | | | | | | | |
| (B'6) | | | | | | | | |
| Evaluation of coatability | | | | | | | | |
| viscosity@210° C. (mPa·s) | 4869 | 7917 | 50333 | 951000 | 4500 | 9500 | 14333 | 9500 |
| viscosity index | 122 | 198 | 1258 | 23775 | 113 | 238 | 358 | 238 |
| coatability | ∘∘ | ∘∘ | ∘ | Δ | ∘∘ | ∘∘ | ∘∘ | ∘∘ |
| Evaluation of water absorption | | | | | | | | |
| water absorption index | 94 | 86 | 62 | 40 | 76 | 73 | 63 | 92 |
| water absorption | Δ | ∘ | ∘∘ | ∘∘ | ∘∘ | ∘∘ | ∘∘ | Δ |
| Evaluation of electrical insulation before water absorption | | | | | | | | |
| volume resistance index | 724 | 809 | 15422 | 140444 | 1138 | 1566 | 2235 | 930 |
| electrical insulation | ∘ | ∘ | ∘∘ | ∘∘ | ∘∘ | ∘∘ | ∘∘ | ∘ |
| Evaluation of electrical insulation after water absorption | | | | | | | | |
| volume resistance index | 161 | 518 | 46212 | 267807 | 503 | 1156 | 6697 | 207 |
| electrical insulation | Δ | ∘ | ∘∘ | ∘∘ | ∘ | ∘∘ | ∘∘ | Δ |
| Evaluation of thermal stability | | | | | | | | |
| phase separation | none | none | none | none | none | none | none | none |
| gelation | none | none | none | none | none | none | none | none |
| Rate of change in viscosity (%) | 4 | −6 | −6 | −7 | 3 | 3 | 3 | 2 |
|  | ∘∘ | ∘∘ | ∘∘ | ∘∘ | ∘∘ | ∘∘ | ∘∘ | ∘∘ |
| Evaluation of adhesion | | | | | | | | |
| tensile shear strength index to polyethylene | 500 | 562 | 385 | 292 | 550 | 385 | 423 | 466 |
| adhesion to polyethylene | ∘∘ | ∘∘ | ∘∘ | ∘ | ∘∘ | ∘∘ | ∘∘ | ∘∘ |

TABLE 1-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| tensile shear strength index to polypropylene | 270 | 290 | 350 | 590 | 284 | 298 | 321 | 223 |
| adhesion to polypropylene | ◯ | ◯ | ◯◯ | ◯◯ | ◯ | ◯ | ◯◯ | ◯ |
| tensile shear strength index to aluminum | 101 | 100 | 77 | 61 | 113 | 100 | 71 | 90 |
| adhesion to aluminum | ◯◯ | ◯◯ | Δ | Δ | ◯◯ | ◯◯ | Δ | ◯ |
| tensile shear strength index to copper | 134 | 134 | 131 | 132 | 161 | 146 | 136 | 126 |
| adhesion to copper | ◯◯ | ◯◯ | ◯◯ | ◯◯ | ◯◯ | ◯◯ | ◯◯ | ◯◯ |

Ex. = Example

TABLE 2

|  | Ex. 9 | Ex. 10 | Ex. 11 | Com-Ex. 1 | Com-Ex. 2 | Com-Ex. 3 | Com-Ex. 4 | Com-Ex. 5 |
|---|---|---|---|---|---|---|---|---|
| (A1) | 70 |  |  | 100 |  | 80 | 80 | 80 |
| (A2) |  | 80 | 70 |  |  |  |  |  |
| (B1) |  | 20 | 30 |  | 100 |  |  |  |
| (B2) |  |  |  |  |  |  |  |  |
| (B3) | 30 |  |  |  |  |  |  |  |
| (B'4) |  |  |  |  |  | 20 |  |  |
| (B'5) |  |  |  |  |  |  | 20 |  |
| (B'6) |  |  |  |  |  |  |  | 20 |
| Evaluation of coatability | | | | | | | | |
| viscosity@210° C. (mPa·s) | 17101 | 6729 | 9960 | 4000 | 2600000 | 9956 | 6775 | 7463 |
| viscosity index | 428 | 168 | 249 | 100 | 65000 | 249 | 169 | 187 |
| coatability | ◯◯ | ◯◯ | ◯◯ | ◯◯ | x | ◯◯ | ◯◯ | ◯◯ |
| Evaluation of water absorption | | | | | | | | |
| water absorption index | 80 | 75 | 59 | 100 | 25 | 91 | 91 | 83 |
| water absorption | ◯ | ◯◯ | ◯◯ | x | ◯◯ | Δ | Δ | ◯ |
| Evaluation of electrical insulation before water absorption | | | | | | | | |
| volume resistance index | 1553 | 1467 | 2229 | 100 | 184889 | 307 | 154 | 440 |
| electrical insulation | ◯◯ | ◯◯ | ◯◯ | x | ◯◯ | Δ | Δ | Δ |
| Evaluation of electrical insulation after water absorption | | | | | | | | |
| volume resistance index | 1010 | 1083 | 6680 | 100 | 2056404 | 530 | 144 | 694 |
| electrical insulation | ◯◯ | ◯◯ | ◯◯ | x | ◯◯ | ◯ | Δ | ◯ |
| Evaluation of thermal stability | | | | | | | | |
| phase separation | none | none | none | none | none | none | present | none |
| gelation | none | none | none | none | none | present | none | present |
| Rate of change in viscosity (%) | 3 | 1 | 3 | -5 | 15 | 352 | -21 | 2061 |
|  | ◯◯ | ◯◯ | ◯◯ | ◯◯ | ◯ | x | Δ | x |
| Evaluation of adhesion | | | | | | | | |
| tensile shear strength index to polyethylene | 517 | 419 | 529 | 100 | 277 | 292 | 238 | 500 |
| adhesion to polyethylene | ◯◯ | ◯◯ | ◯◯ | x | ◯ | ◯ | ◯ | ◯◯ |
| tensile shear strength index to polypropylene | 243 | 183 | 201 | 100 | 275 | 75 | 70 | 95 |
| adhesion to polypropylene | ◯ | Δ | ◯ | x | ◯ | x | x | x |
| tensile shear strength index to aluminum | 80 | 80 | 75 | 100 | 39 | 39 | 38 | 43 |
| adhesion to aluminum | ◯ | ◯ | Δ | ◯◯ | x | x | x | x |
| tensile shear strength index to copper | 109 | 115 | 103 | 100 | 79 | 96 | 88 | 78 |
| adhesion to copper | ◯◯ | ◯◯ | ◯◯ | ◯◯ | Δ | ◯ | ◯ | Δ |

Com-Ex. = Comparative Example

As shown in Table 1 and Table 2, since the polymer compositions of Examples 1 to 11 respectively comprise both of a dimer acid-based polyamide (A) (hereinafter may be referred to as "component (A)") and an olefin-based-modified polymer (B) having a structure derived from an amide (hereinafter may be referred to as "component (B)"), the polymer compositions achieve low water absorption, high electrical insulation, and improved adhesion force to a non-polar substrate such as polyethylene and polypropylene, and a metal such as aluminum and copper. Furthermore, they exhibit neither phase separation nor gelation even when left to stand in a molten state at high temperature; and has excellent thermal stability with small change in viscosity.

While the polymer compositions of Examples have various improved performances by comprising both of the component (A) and component (B), the polymer compositions of Comparative examples exhibit various unbalanced performances due to non-inclusion of any one of the component (A) and the component (B). The polymer compositions of Comparative examples 1, and 3 to 5 include no olefin-based-modified polymer (B) having a structure derived from an amide. The polymer composition of Comparative example 2 does not comprise dimer acid-based polyamide (A).

In comparison with the polymer compositions of Comparative examples, the polymer compositions of Examples have various excellent performances, which demonstrate that the compositions are suitable for use in an electronic component.

INDUSTRIAL APPLICABILITY

The present invention provides a polymer composition. The polymer composition of the present invention is useful as a hot melt composition for molding (sealing) an electronic component.

The invention claimed is:

1. A polymer composition comprising:
   50 to 90 wt % of (A) a dimer acid-based polyamide,
   10 to 50 wt % of (B) an olefin-based polymer,
   wherein the olefin-based polymer (B) is a grafted polymer produced by polymerizing an olefin, a (meth)acrylic acid ester and an acid anhydride, and grafting a polyamide on a copolymer thereby obtained, and
   optionally additives selected from the group consisting of tackifier resin, antioxidant, UV absorber, wax, filler, plasticizer and combinations thereof, wherein the sum of (A) and (B) and additives equals 100 wt %.

2. A hot melt composition comprising the polymer composition as defined in claim 1.

3. An electronic component comprising the hot melt composition as defined in claim 2.

4. A polymer composition according to claim 1, wherein the polyamide used to produce olefin-based polymer (B) is selected from polyamide 6, polyamide 11, polyamide 12 and combinations thereof.

5. A polymer composition according to claim 1, wherein the acid anhydride comprises maleic anhydride.

6. A polymer composition according to claim 1, wherein the dimer acid-based polyamide (A) is a polymer produced by a reaction of an acid component comprising the dimer acid with a diamine component.

7. A polymer composition according to claim 1, wherein the olefin is ethylene, propylene or combinations thereof.

8. A polymer composition according to claim 1, comprising 60-90 wt % of (A) dimer based polyamide and 10-40 wt % of (B) olefin based polymer and optionally additives, wherein the sum of (A) and (B) and additives equals 100 wt %.

9. A polymer composition according to claim 1 consisting of:
   60-90 wt % of the (A) dimer acid-based polyamide and
   10-40 wt % of the (B) olefin-based polymer.

10. A polymer composition according to claim 1, consisting of:
    50 to 90 wt % of the (A) a dimer acid-based polyamide,
    10 to 50 wt % of the (B) an olefin-based polymer, and
    optionally additives selected from the group consisting of antioxidant, UV absorber, wax, filler, plasticizer and combinations thereof,
    wherein the sum of (A) and (B) and additives equals 100 wt %.

11. A polymer composition according to claim 1, wherein the olefin-based polymer (B) comprises 50 to 95 wt % of olefin and 5 to 50 wt % of polyamide, each by weight of the olefin-based polymer (B).

12. A polymer composition according to claim 1, wherein the olefin-based polymer (B) is a grafted polymer produced by polymerizing an alpha olefin homopolymer, a (meth)acrylic acid ester and an acid anhydride, and grafting a polyamide on a copolymer thereby obtained.

* * * * *